United States Patent [19]

Elter et al.

[11] Patent Number: 4,743,424

[45] Date of Patent: May 10, 1988

[54] NUCLEAR REACTOR INSTALLATION

[75] Inventors: Claus Elter, Bad Durkheim; Josef Schoening, Hambruecken; Winfried Wachholz, Winheim/Gorxheimer Tal; Ulrich Weicht, Weinheim, all of Fed. Rep. of Germany

[73] Assignee: Hochtemperatur-Reaktorbau GmbH, Fed. Rep. of Germany

[21] Appl. No.: 914,535

[22] Filed: Oct. 1, 1986

Related U.S. Application Data

[63] Continuation of Ser. No. 677,981, Dec. 4, 1984, abandoned.

[30] Foreign Application Priority Data

Dec. 9, 1983 [DE] Fed. Rep. of Germany ....... 3344527

[51] Int. Cl.$^4$ ................. G21C 7/12; G21C 15/18; G21C 13/02
[52] U.S. Cl. ................... 376/381; 376/226; 376/296; 376/299; 376/461
[58] Field of Search ............. 376/212, 226, 245, 265, 376/283, 284, 285, 288, 289, 296, 298, 299, 381, 382, 383, 411, 458, 459, 461

[56] References Cited

U.S. PATENT DOCUMENTS

| | | | |
|---|---|---|---|
| 3,540,176 | 11/1970 | Hosegood et al. | 376/296 |
| 3,544,425 | 12/1970 | Shaw et al. | 376/285 |
| 3,568,384 | 3/1971 | Cruset et al. | 376/296 |
| 3,583,479 | 6/1971 | Taylor et al. | 376/283 |
| 4,113,559 | 9/1978 | Schweiger | 376/299 |
| 4,223,496 | 9/1980 | Mitterbacher et al. | 376/296 |
| 4,243,487 | 1/1981 | Schweiger | 376/298 |
| 4,279,701 | 7/1981 | Ebata et al. | 376/289 |
| 4,302,293 | 11/1981 | Elter et al. | 376/381 |
| 4,380,085 | 4/1983 | Schoening et al. | 376/381 |
| 4,382,908 | 5/1983 | Peterson | 376/299 |
| 4,459,261 | 7/1984 | Kolodzey et al. | 376/285 |
| 4,476,089 | 10/1984 | Muller-Frank et al. | 376/381 |
| 4,486,380 | 12/1984 | Schweiger et al. | 376/381 |
| 4,490,328 | 12/1984 | Schoening et al. | 376/285 |

FOREIGN PATENT DOCUMENTS

| | | | |
|---|---|---|---|
| 3141734 | 4/1983 | Fed. Rep. of Germany | 376/381 |
| 3226300 | 1/1984 | Fed. Rep. of Germany | 376/299 |
| 1265486 | 11/1961 | France | 376/283 |
| 2060982 | 5/1981 | United Kingdom | 376/283 |

*Primary Examiner*—Deborah L. Kyle
*Assistant Examiner*—Richard L. Klein
*Attorney, Agent, or Firm*—Robert J. Koch

[57] ABSTRACT

A nuclear reactor installation with a high temperture, gas cooled nuclear reactor supported in a cavity on a segmented bottom plate held by a centered point of fixation. The first heat exchangers of the primary circulation loop are arranged in the cavity around the nuclear reactor, with the associated first blowers being supported in first passages of the pressure vessel roof. The second heat exchanger for the removal of the decay heat are arranged similarly, with the associated second blowers located in passages of the pressure vessel bottom. The blowers are equipped with contactless magnetic bearings for the rotors. The drives of the core rods and the reflector rods are designed for a banking operation. Simultaneously, the side reflector is supported by means of radial supports on the thermal side shield elastically and secured against rotation. The measures described provide a simplified configuration without affecting safety.

21 Claims, 2 Drawing Sheets

NUCLEAR REACTOR INSTALLATION

This application is a continuation of application Ser. No. 677,981, filed Dec. 4, 1984, now abandoned.

BACKGROUND OF THE INVENTION

Field of the Invention

The invention concerns a nuclear reactor installation comprising a cavity which is lined with a liner and arranged in a prestressed concrete pressure vessel. A high temperature reactor is provided on a circular base plate in the cavity. A plurality of core rods may be inserted into and retracted from an internal space containing spherical fuel elements by means of rod drives; and a plurality of reflector rods may be inserted into and retracted from a side reflector of said reactor by means of rod drives. The spherical fuel elements may be introduced by means of fuel element feeder-tubes and removed by at least one vertical, cooled outlet tube disposed on a base reflector. The nuclear reactor installation also has an annular cylindrical interstitial space formed between a thermal side shield and the liner. The thermal side shield surrounds a side reflector which forms a reactor core. The thermal side shield supports said reflector with radial supports. First heat exchangers, preferably steam generators, are arranged uprightly, aligned with an axial first passage through the roof of the pressure vessel. Said first heat exchangers are also interconnected with first blowers of a gas circulation loop through the nuclear reactor.

Nuclear reactor installations of this type must satisfy particularly high safety requirements. This leads, in the case of known installations, particularly those with high capacity, to very expensive and cost intensive structures. Such added expense holds true for both the prestressed concrete pressure vessel and the development and arrangement of the individual structural elements of the nuclear reactor.

SUMMARY OF THE INVENTION

It is therefore an object of the invention to provide a nuclear reactor of the aforementioned type, particularly one with a capacity of approx. 300 MWe to 600 MWe; one which is suitable both for generating steam and supplying process heat; and one which has a simplified construction or individual structural elements, respectively, which are simply designed.

It is also an object of the present invention to provide a nuclear reactor which allows radial expansions in a simple manner.

It is a further object of the present invention to provide a nuclear reactor with a uniform capacity distribution of the spherical fuel elements so that hot strands are avoided.

It is an object of the present invention to provide a nuclear reactor with simplified rod drive mechanisms and corresponding control means.

It is an object of the present invention to provide a nuclear reactor which ensures a uniform passage rate of the fuel elements through the reactor core so as to increase efficiency.

It is also an object of the present invention to provide a nuclear reactor in which radiation induced stresses in the reflector rods are reduced and limited. All of these objects should be met by the nuclear reactor according to the invention without comprising the reactors satisfaction of safety requirements.

The above objects of the invention are attained with a nuclear reactor plant of the aforementioned type wherein:

the bottom plate is composed of segments which are centered around a central reference point, and which are supported by means of radially displaceable double supports on the bottom of the pressure vessel;

core rods are equipped with rod drives by means of which the core rods may be inserted, in a concerted manner, to only a part of the layer height of the spherical fuel elements, i.e., all the rods move simultaneously and to the same height;

the reflector rods are equipped with electric motor rod drives;

several uniformly distributed fuel element outlet tubes are provided in the bottom reflector for the discharge of fuel elements which pass through the nuclear reactor;

first blowers are arranged in first passages through the roof of the pressure vessel, and disposed on slides guided in magnetic bearings;

at least one upright heat exchanger is provided in the interstital space for removing the decay heat;

a second passage, with which said heat exchanger is aligned, passes lengthwise through the bottom of the pressure vessel;

a corresponding second blower is provided in said second passage, also dispositioned on slides with magnetic bearings;

radial supports, particularly in the case of nuclear reactors with a capacity in excess of 400 MVe, are designed to be elastic and to prevent relative movements between the side reflector and the thermal side shield and are provided in at least the upper third of the height of the side reflector.

Further objects, features, and advantages of the present invention will become apparent from the detailed description of preferred embodiments which follows, when considered together with the attached figures of drawings.

BRIEF DESCRIPTION OF THE DRAWINGS

In the Drawings.

Similar parts are provided in the individual figures with identical reference symbols.

DETAILED DESCRIPTION OF THE PREFERRED EMBODIMENTS

Figure 1:
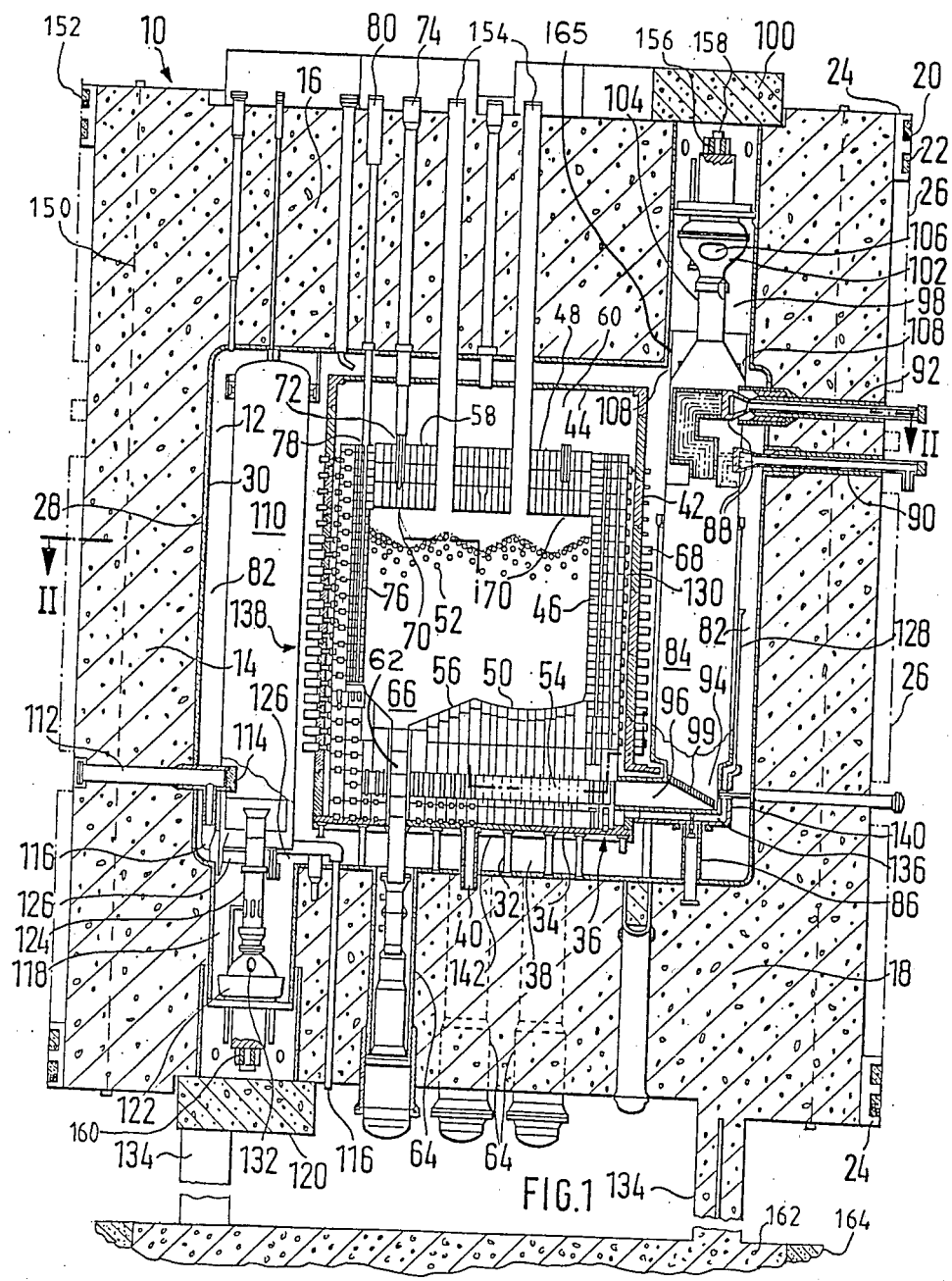
FIG. 1 shows a vertical cross section through a nuclear reactor installation on the line I—I of FIG. 2.

The bottom plate, assembled of segments in a simple manner, functions to thermally shield in addition to supporting the nuclear reactor. The bottom plate is centered only about a central reference point so that thermal expansions in the radial direction are allowed in a simple fashion by means of the double supports provided.

The concerted manner of operation of the core rods leads to a uniform capacity distribution of the spherical fuel elements, so that hot strands are avoided. Measurement of the temperature distribution of the gaseous heat carrier under the core is not required, because measurement of the temperature prior to the entry of heat transfer medium into the heat exchanger is sufficient. The elimination of hot strands further results in a reduction of the thermal stresses acting on subsequent heat exchangers. The reduced depth of penetration of the core rods into the pile of spherical fuel elements also diminishes the number of damaged fuel elements.

As the reflector rods are not required to occupy intermediate positions, the rod drive mechanisms as well as the corresponding control means provided for them are simplified. Bypass cooling and thermal insulating bushings are no longer necessary.

The arrangement of several fuel element outlet tubes reduces the mechanical stress on the core rods, because the motion of the fuel elements is directed essentially downward and the bending stresses caused with a single outlet tube as the result of the curving flowlines of the fuel elements are avoided. At the same time, the distribution of capacity and the burn-up of the fuel elements becomes more uniform, resulting in reduced fuel costs. Finally, the arrangement of several fuel element outlet tubes permits a lesser reactor core height, because the outlet cones associated with the individual fuel element outlet tubes, through which the spherical fuel elements pass, are small in relation to the diameter of the reactor core.

The aligned arrangement of the first and the second heat exchangers with the first and second passes makes it above all possible to insert and install the two heat exchangers through these passages, provided obviously that the external diameters of the heat exchangers are coordinated with each other. It is further possible to place the blowers associated with the heat exchangers in these passages. As the passages are located in the base and the roof of the pressure vessel, the cylindrical part of the pressure vessel remains largely undisturbed, thus facilitating the arrangement of horizontal tension cables. The magnetic bearing support of the blowers renders it easier to install them along a vertical axis, whereby the gaseous heat transfer medium may be directly suctioned from the heat exchangers over the shortest path. Additionally, the expensive oil and sealing gas supply devices, fire protection and penetration sleeve installations required in conventional blowers are eliminated. Contactless seating by means of magnetic bearings applies in each case to the part carrying the drive motor and the impellers of the blower, but for the sake of simplicity only slides are mentioned herein. In order to ensure the operation of the blowers without interference, mechanical safety bearings are provided, which take over the guidance of the blower slides. Such a case is unlikely, as the power electronics supplying the magnets of the magnetic bearing is redundant. In case of failure of one electronic unit, continuing operation by the other electronic unit is assured without interruption.

Finally, an elastic, but adequately rigid fastening of the reflector is achieved by means of the elastic, shock-absorbing design of the radial supports.

Overall, the application of the characteristics according to the invention makes possible the design of a nuclear reactor with reduced expenditures, but with a high degree of safety.

An advantageous further development of the invention may comprise providing the reference point as a vertical pipe fastened in the bottom of the pressure vessel and engaging recesses for guiding the base plate segments disposed in said segments.

In order to obtain a particularly uniform passage rate of the fuel elements through the reactor core, it is advantageous that the fuel element outlet tubes are distributed annularly and led outwards, in each case, through aligned third passages which extend axially in the base of the pressure vessel. The single passage of the fuel elements through the reactor core is advantageous in view of the fact that cooling requirements for the fuel element outlet tubes are lower as the result of the lesser residual heat.

Another advantageous further development of the invention, which leads to the reduction and limitation of radiation induced stresses in the reflector blocks, comprises providing slits and/or cooling means for the reflector blocks in the areas exposed to high doses of radiation.

Different spring elements are suitable for elastically mounting the radial supports; in order to combine short structural lengths with a high degree of elasticity, it is, however, advantageous to equip the radial supports with disk springs.

A particularly preferred embodiment of the invention is characterized in that the heat carrier loops, which leads through the first heat exchangers, and those of the second heat exchangers, which serve to remove the decay heat, are completely separated from one another. Advantageously, the second heat exchangers are placed high enough with respect to the nuclear reactor so that the decay heat emanating from the nuclear reactor is transferred to the second heat exchangers by natural convection. This provides maximum safety even in case of a failure of the blowers. The thorough separation of the two circulation loops renders the localization of first heat exchangers which develop leaks in operation unnecessary. In such a case, all of the first heat exchangers will be taken out of service. This considerably simplifies the humidity measurements of the gas loop which passes through the first heat exchangers (primary loop), because it is only necessary to determine the humidity at single central location in the primary loop.

A further highly advantageous embodiment of the invention comprises equipping the heat exchangers with collectors located inside the heat exchanger housings for the heat carriers (such as steam and/or water) of the secondary loop. The inwardly disposed collectors for steam and/or feed water provide for an economical construction. For supply and removal, respectively, only a single pipe must be passed through the vessel seal to the outside. The passage of the pipe is thus considerably simplified. It is further possible, in case of a failure of individual heat exchanger tubes, to seal off the affected tube within the pressure vessel, thus reducing the extent of the repair effort.

In order to keep thermal stresses away from the heat exchangers it is further advisable to locate the connecting lines leading to the outside of the heat exchangers at the height the suspensions of the heat exchangers. The pipelines are thus removed in the vicinity of the reference points of the heat exchangers, so that the lines are only slightly affected by thermal length variations and only small expansions must be compensated for.

In order to determine the thermal capacity of the nuclear reactor, the mass flow of the gaseous heat carrier must be measured. This may be determined advantageously by determining the rotational speed of the first blower and calculating the mass flow from the rotational speed of the blower by means of the blower characteristic curve. Beyond this, it is advisable in many cases to determine the difference in pressure between the inlet and the outlet of the blower and to correct the measured value of the mass flow on the basis of this pressure difference. A characteristic curve of the blower, which indicates the dependence of the mass flow on the difference in pressure, is used for the purpose.

The liner is advantageously provided with a fiber insulation, such as rock wool, for example. This provides advantages with regard to costs, thermal behavior and vibrational behavior. It is advisable to cover this insulation with overlapping metal cover sheets held on the liner by a plurality of bolts. The number of bolts is chosen such that only slight stresses occur in them. This renders the bolts extensively failure proof, which amounts to redundant fastening.

A further development of the invention comprises providing the prestressing elements or prestressing cables of the concrete pressure vessel with a corrosion protective layer of cement mortar. This method of corrosion protection is especially economical in relation to other comparable measures.

In order to install the concrete pressure vessel at a low cost, it is advantageous to connect the concrete pressure vessel to a foundation by means of segments of annular cross sections which are secured at their ends.

The economy of the construction of the pressure vessel is further advantageously affected by equipping the concrete pressure vessel with two safety valves with subsequent rupture disks in series. The rupture disks are dimensioned for the necessary full releasing capacity and preferably staggered with respect to their response pressures.

The nuclear reactor installation according to the invention comprises a concrete pressure vessel 10 of an upright, cylindrical configuration. A cavity 12 also of a cylindrical shape is arranged coaxially inside the pressure vessel. The cavity 12 is bounded laterally by an annular, cylindrical wall 14 of the pressure vessel. The cavity 12 is bounded on top by a roof 16 of the pressure vessel and at the bottom by a base 18 of the pressure vessel. The pressure vessel is provided with vertical and horizontal prestressing. The horizontal, annular prestressing is obtained by means of prestressing cables 20 which are looped around the pressure vessel on the outside. For this purpose, the prestressing cables 20 are placed in grooves 22 which are arranged in annular segment-shaped cable carriers 24. The cable carriers in turn rest against the periphery of the pressure vessel. In order to prevent the corrosion of the prestressing cables, the interstices between the prestressing cables and the grooves are filled with cement mortar 152. FIG. 1 shows only a few of the cable supports; the pressure vessel is obviously provided with and prestressed by cable carriers over its entire height. The regions in which cable carriers are provided, are indicated by dash-and-dot lines 26.

Prestressing cables are also provided for vertically prestressing the concrete pressure vessel; they are placed vertically in a wall 14 of the pressure vessel.

The cavity 12 and the passages or openings leading from the cavity to the outside are clad with a steel liner 28. The liner 28 is equipped with fiber insulation 30 for thermal insulation, which may comprise rock wool, for example.

In the cavity, a plurality of vertical double supports 32 is fastened to the base 18 of the pressure vessel or to a corresponding area of the liner 28, respectively. Segments 34 of the base plate 36 are placed on the upper ends of these double supports 32 in such a manner such that they may expand freely. In order to form the segments, the circular base plate is divided radially. The segments have recesses toward the center of the base plate 36 which are engaged by a vertical pipe 40. The vertical pipe 40 serves as the reference point of the segments 34. The lower end of the pipe 40 is secured in the concrete of the pressure vessel base 18. The distance between the base area of the liner 28 and the base plate 36 is chosen so that a lower interstitial space 38 is formed.

An annular, cylindrical thermal side shield 42, which extends vertically, rests on the edge of the base plate 36. The upper end of said thermal side shield is closed off by a cover shaped thermal roof shield 44, while the bottom plate 36 serves as a thermal base shield. The thermal shields are made of steel, just like the base plate 36.

A reflector inside the thermal shield is arranged to form a cylindrical reactor core gap 130. The reflector comprises an annular cylindrical side reflector 46 aligned coaxially with the thermal shield, a roof reflector 48 which rests on the side reflector, and a bottom reflector 50 placed directly on the bottom plate 36. Spherical fuel elements 52 are stored inside the graphite reflector in the form of a pebble bed, as indicated in FIG. 1.

A horizontal hot gas collecting chamber 54 is provided in the base reflector 50. The chamber 54 is connected with the inner space of the reflector by means of vertical channels 56 which pass through the base reflector 50. In a similar manner, the roof reflector 48 is also equipped with vertical channels 58 which open into the cavity 60 between the roof reflector 48 and the thermal roof shield 44.

The base reflector 50 is additionally equipped with four vertical fuel element outlet tubes 62, which pass through the base plate 36 and through aligned and lined third passages 64 in the pressure vessel base 18 into fuel element containers on the outside. As is particularly seen in the cross section according to FIG. 2, the fuel element outlet tubes 62 are arranged uniformly distributed on an annulus. The inlet of each of the fuel element outlet tubes 62 is equipped with an inlet funnel or inlet cone 66, which facilitates the removal of the spherical fuel elements. Obviously, all of the passages which lead through the pressure vessel 10 to the outside must be sealed at the outside in a gas-tight and radiation-tight manner. The inlet cones 66 are recessed into the base reflector 50.

In order to be able to support the side reflector 46, a plurality of horizontal radial supports 68 which elastically support the side reflector 46, are fastened to the thermal side shield. Additionally, the radial supports are provided with disk springs to serve as spring elements. The radial supports further act as a security against peripheral movements of the side reflector and for preventing rotation. A plurality of radial supports 68 is provided in order to obtain a uniform support structure.

Figure 2:
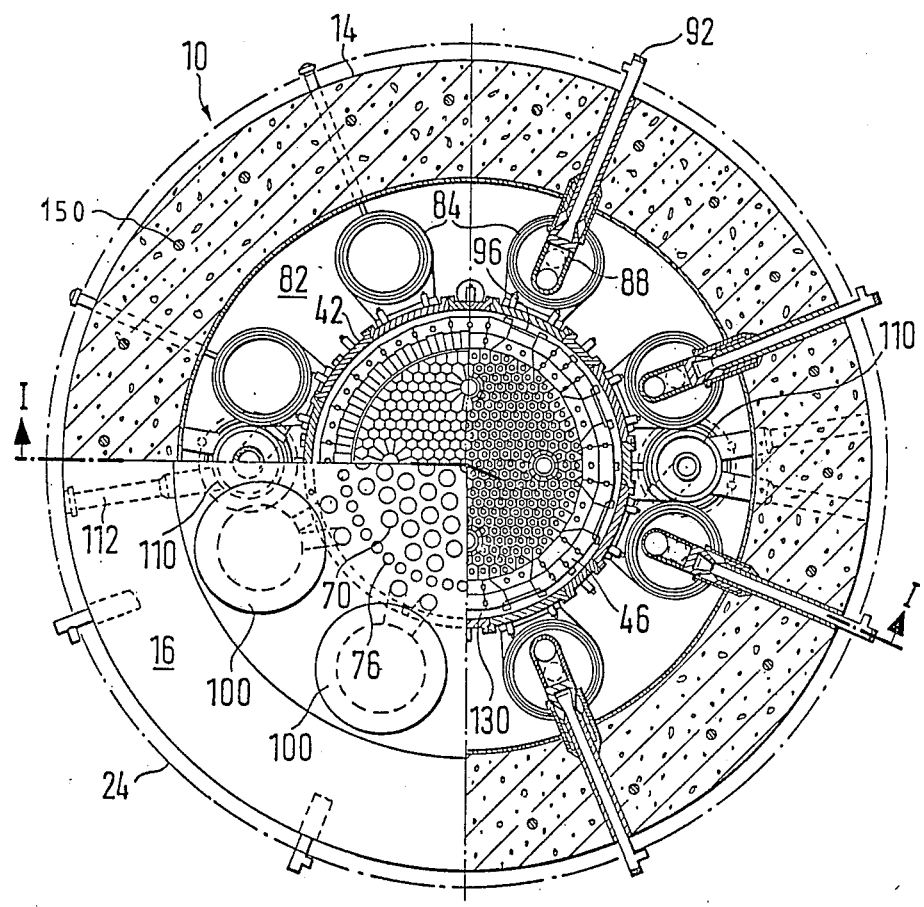
FIG. 2 shows a horizontal section through the object of FIG. 1 according to the line II—II, with the lower left rectangular segment showing a top view of the pressure vessel.

The roof reflector 48 is further equipped with a plurality of vertical roof channels 70 having a circular cross section, as may be seen in FIG. 2. A core rod 72 is arranged in each of said roof channels 70, so that the rods 72 may be inserted vertically into and retracted from the pebble bed 52 by a rod drive 74 disposed outside the pressure vessel 10. The drives 74 and their controls, respectively, are arranged in such a manner that all of the core rods 72 may be inserted into the pebble bed in a concerted operation, but only over a fraction of the layer height of the pebble bed. The term 'concerted operation' is intended to indicate that all of the core rods move simultaneously and at the same height. FIG. 1 shows only one drive and one core rod, but obviously a plurality of them is present, as may be particularly surmised from the number of roof channels 70 shown in FIG. 2.

Furthermore, a plurality of vertical lateral channels 76 is also built int the side reflector 46. This is particularly seen in FIG. 2, which also indicates the annular arrangement of these channels. A plurality of reflector rods 78 is arranged in the lateral channels and may be inserted into and extracted vertically from the lateral channels. For this purpose, exactly as in the case of the core rods, a rod drive 80 is provided outside the pressure vessel 10 corresponding to each rod. The drive mechanism again passes through the roof 16 of the pressure vessel, the liner 28 and the thermal roof shield 44. The rod drive 80 and its control are designed in such a manner that no intermediate positions may be set during the insertion. The rod drive is thus significantly simplified.

An annular, cylindrical interstitial space 82 is formed between the pressure vessel wall 14, the liner 28 and the thermal side shield 42, respectively. The first heat exchangers, eight in the present embodiment, are uniformly distributed within the interstitial space 82, as may be seen with particular clarity in FIG. 2. A plurality of heat exchanger tubes, not shown, is provided in the first heat exchangers 84. The heat exchanger tubes open into a collector 88 located within the heat exchanger housing. From these collectors, connecting lines lead radially to the outside through the pressure vessel wall 14. A first connecting line 90 serves to supply feed water, for example, and a second connecting line 92, aligned with and over the first line, serves to remove the steam generated.

The first heat exchangers are cylindrical in shape and extend appriximately vertically above the height of the thermal side shield 42. The lower ends of the heat exchangers 84 have downwardly directed connected openings 94 by means of which transfer gas heated in the nuclear reactor 138 is brought into contact with the heat exchanger tubes. In addition, the connecting opening 94 is provided with a horizontal connecting line 96, which leads radially inward into the hot gas collecting chamber 54. A rectifier 99 is installed for correcting the flow, at a 90° bend from the connecting line 96 to the connecting opening 94. The flow rectifier comprises a plate with a plurality of perforations. The diameters of the holes are small with respect to the thickness of the plate. The connection of the individual first heat exchanger 84 with the hot gas collector chamber 54 is also seen clearly in FIG. 2.

It should be further noted that the first heat exchangers 84 are suspended in the area 165 of the connecting lines 90, 92 and arranged at the upper end, so that the heat exchangers may expand without appreciably affecting the connecting lines.

A vertical first passage 98 with a circular cross section and alignment with said first heat exchangers 84 is provided for each heat exchanger. Said passages being sealed in a gas-tight manner from the outside with a concrete cover 100. A first blower 102 is located in each of the passages 98. The suction side of the blower 102 is connected with the upper end of the first head exchanger 84 by means of a line 104, so that the exchanger tubes of the heat exchanger may be exposed to hot gas, i.e. the hot heat transfer gas. The outlet openings 106 of the first blowers open into the passage 98. The passage, in turn, is connected with the interstitial space 82 through passage openings 108.

The rotors of the first blowers 102 are supported without contact in magnetic bearings, thereby eliminating lubrication problems for example. As seen in FIG. 1, the first blowers 102 and the second blowers 122 are in the form of axial blowers arranged with vertical axles. It should be further noted that the term "rotor" is intended to signify the rotating parts, for example the drive motor and the impeller shaft.

As for capacity measurements of the nuclear reactor, the mass flow of the hot gas must be determined, and the rotational speed of the first blowers 102 must be measured by means of suitable instruments 158 such as a tachometer. The mass flow of the gas conveyed may be determined from these measured valves with the aid of the blower characteristic curve.

The second heat exchangers 110 are located between the first heat exchangers 84, also in the interstitial space 82. In the present embodiment, there are two second heat exchangers which are arranged diametrically opposed to each other, as may be particularly seen in the cut-away representation of FIG. 2. The vertically arranged, cylindrically shaped second heat exchangers 110 serve to remove the residual heat of the nuclear reactor. They extend approximately over the height of the thermal side shield 42 and comprise a plurality of connector pipes 112 in their lower end region, which extend adjacently to each other in a horizontal plane. Said collector pipes lead into the second heat exchangers from the outside and each form a collector 114. Said collectors 114 are connected with the heat exchanger tubes of the second heat exchangers 110 within the heat exchanger housing. Each of the collector pipes 112 is connected, within the interstitial space 82, with a pipeline 116 leading into the lower interstitial space 38. From there, the pipelines 116 pass vertically downward through the bottom 18 of the pressure vessel and to the outside. A cooling medium, water for example, is introduced and removed through the pipelines 116.

A second passage 118, having a circular cross section, is arranged in the pressure vessel 18 so as to be aligned with the second heat exchangers 110, and extend vertically downward. The passage 118 is sealed to the outside in a gas-tight manner by means of a concrete cover 120. The cross section of the second passage 118, just like that of the first passage 98, is chosen so that the heat exchangers may be installed and removed through these passages. A second blower 122 is located in the second passage 118 in each case. Said second blower 122 is in the form of an axial blower with a vertically rotating axle, exactly like the first blower 102 with magnetic bearings 160. The central inlet passage of the second blower 122 is connected, by means of a pipeline 124, with that internal space of the second heat exchanger 110 in which the cooling pipes are arranged. The outlet openings 132 of the second blowers open into the second passage 118 which is connected with the cavity 12 by means of the orifices 126. The cavity is, in turn, connected with the internal space of the second heat exchangers.

The cavity 12 is equipped with two safety valves, not shown, the outlets of which lead into a chimney, not shown. Rupture disks are provided in the outlet line to prevent leakage losses. Each of these safety valves is dimensioned for the full release capacity required. The response pressure of the two safety valves is staggered. This means that one safety valve will respond initially and, if the internal pressure continues to rise, the second safety valve will be actuated.

In order to provide a safe, simple foundation for the concrete pressure vessel 10, it is secured to a plurality of ring segment-shaped concrete supports 134 which are joined to a foundation 162 anchored in the ground 164.

In actual operation, the first blowers 102 run and convey gas, preferably helium, which serves as the heat transfer medium. The gas, heated in the nuclear reactor 138, is conveyed through the first heat exchanger 84 in order to transfer the heat. The path of the heat transfer medium forming the primary circulation loop is as follows: starting from the outlet openings 106 the heat transfer medium flows downward in the first passage 98 and enters the cavity 12 through the passage orifices 108. The heat transfer medium then flows downward while cooling structural parts present in the cavity, such as the thermal side shield, for example.

For further conveying the gas, gas guiding jackets 128 are provided in the first eight heat exchangers 84 which guide the heat transfer gas downward along the outside of the first heat exchanger 84. The first heat exchanger 84 is thus cooled. The gas guiding jackets 128 extend to approximately one-half of the height of the first heat exchangers and have a funnel shaped expansion at the gas inlet. At the lower end of the gas guiding jackets 128, the heat transfer gas enters the gas channel 136 which annularly surrounds the connecting line 96 and is bounded on the outside by the shielding 140. From there, the transfer gas flows into the gap 130 formed by the thermal side shield 42 and the side reflector 46. Part of the heat transfer gas flows around the double supports 32 and is again conducted into the gap 130 by means of a baffle plate 142 extending spaced from the base plate 36.

In this annular cylindrical gap 130 the heat carrier flows upwards while cooling the adjacent structural elements and enters the cavity 60. Next, the gaseous heat transfer medium is divided over the individual channels 58 which lead into the core of the nuclear reactor in which the spherical fuel elements 52 are arranged. The heat transfer medium flows downwards around the spherical fuel elements 52 while being heated, and enters the channels 56 of the base reflector which open into the hot gas collecting chamber 54. The heat transfer medium is then distributed over the individual first heat exchangers 84 and flows toward the connecting opening 94 of each first heat exchanger, by way of the connecting line 96 and the flow rectifier 99. The heat transfer medium flows upwards in the first heat exchangers 84 while transferring heat to the heat exchanger tubes and is conducted through the line 104 to the intake fitting of the first blower 102, thus closing the primary circulation loop.

The feed water introduced through the first connecting line 90 is thereby evaporated and the steam generated is led away by the second connecting line 92. The feed water-steam loop forms the secondary circulation loop, which conducts heat from the pressure vessel to the outside. In order to be able to determine the performance of the nuclear reactor, the temperature of the gaseous heat transfer medium is measured both when entering and leaving each first heat exchanger 84 and, from the temperature difference and mass flow conveyed by the associated first blower, the thermal capacity of the reactor is calculated. The spherical fuel elements 52 are introduced into the nuclear reactor on top through fuel elements input tubes, not shown, and removed through the fuel element outlet tubes 62 and stored in containers. The fuel elements pass through the nuclear reactor only once.

The second heat exchangers 110 are provided for emergencies or for the removal of the residual heat of the reactor after the shutdown of the reactor. The shutdown of the reactor is effected initially by the insertion of the reflector rods 78. For the final shutdown of the installation, the core rods 72 are inserted.

To remove the residual heat, the second blowers 122 are actuated; they convey the gaseous heat transfer medium in the same manner through the second heat exchanger 110 into circulation. The heat transfer medium hereby leaves through the outlet openings 132 of the second blower, flows upwards in the second passage 118 and enters the cavity 12. Next, the heat transfer medium takes up the decay heat of the nuclear reactor and is subsequently sucked downward into the second heat exchanger 110. After flowing through the second heat exchanger and transfering heat to the heat exchanger tubes, the heat carrier is conducted through the line 124 to the second blower 122 for recirculation. The heat transferred by the gaseous heat transfer medium is removed from the nuclear reactor and the pressure vessel by a heat transfer medium flowing in and out through the pipelines 116.

The small diameter passages shown in the figures and leading from the outside inward serve to allow inspection of the cavity 12 and/or to introduce instruments or other manipulators.

What is claimed is:

1. A nuclear reactor installation comprising:
   a prestressed concrete pressure vessel having a cavity, a base and a roof;
   a liner for lining said cavity;
   a circular base plate comprising segments which are centered about a central reference point;
   radially displaceable double supports disposed on the base of said pressure vessel which function to support said segments of said circular base plate;
   a gas-cooled, high-temperature pebble bed nuclear reactor comprising an internal space for containing spherical fuel elements, a base reflector on the bottom of the reactor, a side reflector on the sides of the reactor, and a top reflector;
   a plurality of core rods arranged for insertion into and retraction from said fuel elements-containing internal space;
   first rod drive means for inserting and retracting said core rods in a concerted manner to the same height in said fuel element-containing internal space, said height being less than the height of the fuel elements;
   a plurality of reflector rods arranged for insertion into and retraction from said side reflector;
   second rod drive means for inserting and retracting said reflector rods;
   a plurality of uniformly distributed fuel element outlet tubes for removing the spherical fuel elements so that the fuel elements only make one pass through the nuclear reactor disposed in said reflector;
   a plurality of fuel elements inlet tubes for introducing the fuel elements into said internal space;

a thermal side shield which surrounds said side reflector and which defines a gap between itself and the side reflector;

an annular, cylindrical interstitial space defined between said liner and said thermal side shield;

a plurality of first passages distributed uniformally leading through the roof of said pressure vessel into said interstitial space including passage orifices leading into said interstitial space;

first blowers arranged in said first passages having outlet orifices opening into said first passages;

first upright heat exchanging means for utilizing the heat generated by the reactor which comprises a heat transfer medium, suspending means for securing said heat exchanging means and connecting lines which lead radially outward through the pressure vessel, wherein said connecting lines are disposed at a height corresponding to said suspending means; said heat exchanging means being aligned with said first passage;

second passages extending lengthwise from said interstitial space through the base of the pressure vessel and offset with respect to the first passages, said second passages exhibiting second passage orifices leading to said interstitial space;

second upright heat exchanging means which comprise a heat transfer medium, which is aligned with said second passage and which function to remove residual heat from the reactor;

second blowers disposed in said second passages having outlet orifices within said second passages and associatd with said second heat exchanging means; and elastic radial supports which serve to support said side reflector and which prevent rotational movements between the side reflector and the thermal side shield.

2. A pebble bed nuclear reactor according to claim 1, wherein said first and second blowers comprise rotors guided in magnetic bearings.

3. A pebble bed nuclear reactor according to claim 1, wherein said first heat exchanging means comprises at least one steam generator.

4. A pebble bed nuclear reactor according to claim 1, wherein said segments of said circular base plate have recesses which guide them, and wherein said central reference point comprises a pipe which is secured to the base of the pressure vessel and which engages said recesses.

5. A pebble bed nuclear reactor according to claim 1, further comprising axial third passages for conducting said fuel element outlet tubes through the base plate of the pressure vessel and wherein said fuel element outlet tubes are arranged in an annular pattern.

6. A pebble bed reactor according to claim 1, further comprising horizontal pressure vessel prestressing cables arranged at said first and second blowers; and wherein said first and second blowers comprise rotors guided in magnetic bearings.

7. A pebble bed nuclear reactor according to claim 1, further comprising a first circulation loop for gaseous heat transfer medium corresponding to said first heat exchanging means, and a second circulation loop for gaseous heat transfer medium corresponding to said second heat exchanging means for the removal of residual heat, wherein said second loop is completely separated from said first loop.

8. A pebble bed nuclear reactor according to claim 1, wherein said second exchanging means is so situated that the decay heat emanating from the nuclear reactor may be transferred to said heat exchanging means by natural convection.

9. A pebble bed nuclear reactor according to claim 1, wherein said heat exchanging means comprise housings, and collectors within said housings for containing heat transfer medium.

10. A pebble bed nuclear reactor according to claim 1, further comprising means for measuring the rotational speed of said first blowers.

11. A pebble bed nuclear reactor according to claim 1, wherein sid liner comprises fibrous insulation.

12. A pebble bed nuclear reactor according to claim 1, further comprising a foundation, and a plurality of concrete supports, wherein said supports have annular segment-shaped cross sections and are fixed at both ends for connecting the pressure vessel with the foundation.

13. A pebble bed reactor according to claim 1, wherein said first passages exhibit a cross section of at least equal dimensions as a cross section of said first heat exchanging means, and said second passages exhibit a cross section of at least equal dimensions as a cross-section of said second heat exchanging means.

14. A pebble bed nuclear reactor according to claim 1, further comprising means for prestressing said concrete pressure vessel.

15. A pebble bed nuclear reactor according to claim 14, wherein said means for prestressing said concrete pressure vessel further comprises horizontal prestressing cables, vertical prestressing cables and a coating of cement mortar on said horizontal prestressing cables for preventing corrosion.

16. A nuclear reactor installation comprising:

a prestressed concrete pressure vessel having a cavity, a base and a roof;

a liner for lining said cavity;

a gas-cooled, high-temperature pebble bed nuclear reactor comprising an internal space for containing spherical fuel elements, a base reflector on the bottom of the reactor, side reflector on the sides of the reactor, and a top reflector;

a plurality of core rods arranged for insertion into and retraction from said fuel elements-containing internal space;

rod drive means for banked inserting and retracting said core rods in a concerted manner to the same height in said fuel element-containing internal space, said height being less than the height of the fuel elements;

a plurality of uniformly distributed fuel element outlet tubes for removing the spherical fuel elements disposed in said base reflector;

an annular, cylindrical interstitial space defined between said liner and said side reflector;

a plurality of first passages distributed uniformally leading through the roof of said pressure vessel into said interstitial space;

first blowers arranged in said first passages having outlet orifices opening into said first passages;

first upright heat exchanging means for utilizing the heat generated by the reactor which comprises a heat transfer medium, suspending means for securing said heat exchanging means and connecting lines which lead radially outward through the pressure vessel, wherein said connecting lines are disposed at a height corresponding to said suspending means; said heat exchanging means being aligned with said first passage;

second passages extending lengthwise from said interstitial space through the base of the pressure vessel and offset with respect to the first passages;

second upright heat exchanging means which comprises a heat transfer medium, which is aligned with said comprise a heat transfer medium, which is aligned with said second passage and which function to remove residual heat from the reactor;

second blowers disposed in said second passages having outlet orifices within said second passages and associated with said second heat exchanging means.

17. A pebble bed nuclear reactor according to claim 16, wherein said first and second blowers comprise rotors guided in magnetic bearings.

18. A pebble bed nuclear reactor according to claim 16, further comprising a first circulation loop for gaseous heat transfer medium corresponding to said first heat exchanging means, and a second circulation loop for gaseous heat transfer medium corresponding to said second heat exchanging means for the removal of residual heat,, wherein said second loop is completely separated from said first loop.

19. A pebble bed nuclear reactor according to claim 16, further comprising means for measuring the rotational speed of said first blowers.

20. A pebble bed nuclear reactor according to claim 16, further comprising means for prestressing said concrete pressure vessel.

21. A pebble bed nuclear reactor according to claim 20, wherein said means for prestressing said concrete pressure vessel further comprises horizontal prestressing cables, vertical prestressing cables and a coating of cement mortar on said horizontal prestressing cables for preventing corrosion.

* * * * *